(12) United States Patent
Van De Rostyne et al.

(10) Patent No.: US 8,245,350 B2
(45) Date of Patent: Aug. 21, 2012

(54) WIPER BLADE

(75) Inventors: Kris Van De Rostyne, Opvelp (BE); Paul Wynen, Neerpelt (BE)

(73) Assignee: Robert Bosch GmbH, Stuttgart (DE)

( * ) Notice: Subject to any disclaimer, the term of this patent is extended or adjusted under 35 U.S.C. 154(b) by 421 days.

(21) Appl. No.: 12/669,814

(22) PCT Filed: Jul. 14, 2008

(86) PCT No.: PCT/EP2008/059164
§ 371 (c)(1), (2), (4) Date: Jan. 20, 2010

(87) PCT Pub. No.: WO2009/024410
PCT Pub. Date: Feb. 26, 2009

(65) Prior Publication Data
US 2010/0180396 A1    Jul. 22, 2010

(30) Foreign Application Priority Data
Aug. 22, 2007  (DE) .......... 10 2007 039 563

(51) Int. Cl.
*B60S 1/38* (2006.01)
(52) U.S. Cl. ........... 15/250.48; 15/250.361; 15/245; 29/412; 264/146; 264/157; 264/161; 264/177.1
(58) Field of Classification Search ........ 15/250.361, 15/250.48, 245
See application file for complete search history.

(56) References Cited

U.S. PATENT DOCUMENTS

| | | | | |
|---|---|---|---|---|
| 2,651,800 A | * | 9/1953 | Picon | 15/250.43 |
| 3,001,221 A | * | 9/1961 | Wojciechowski | 15/250.48 |
| 3,035,297 A | | 5/1962 | Overman et al. | |
| 3,461,477 A | * | 8/1969 | Ikner | 15/250.06 |
| 4,317,250 A | * | 3/1982 | Shutts | 15/244.1 |
| 4,342,129 A | * | 8/1982 | Thompson | 15/250.4 |
| 4,587,686 A | * | 5/1986 | Thompson | 15/250.48 |
| 4,981,637 A | * | 1/1991 | Hyer | 264/146 |
| 5,478,605 A | * | 12/1995 | Ichise | 427/276 |
| 5,661,871 A | * | 9/1997 | Scorsiroli | 15/250.452 |
| 7,523,523 B2 | * | 4/2009 | Shoup | 15/250.4 |
| 2001/0032370 A1 | * | 10/2001 | Hoshino | 15/250.43 |
| 2008/0222833 A1 | * | 9/2008 | Henin et al. | 15/250.201 |
| 2009/0241282 A1 | * | 10/2009 | Marc | 15/250.48 |
| 2010/0205764 A1 | * | 8/2010 | Pieters et al. | 15/250.48 |
| 2011/0081515 A1 | * | 4/2011 | Lay | 428/60 |

FOREIGN PATENT DOCUMENTS

| | | |
|---|---|---|
| DE | 2336271 A1 | 2/1975 |
| DE | 19612231 A1 | 10/1997 |

OTHER PUBLICATIONS

PCT/EP2008/059164 International Search Report.

* cited by examiner

*Primary Examiner* — Robert Canfield
(74) *Attorney, Agent, or Firm* — Michael Best & Friedrich LLP

(57) ABSTRACT

The invention relates to a wiper blade (10) with a wiper strip (14) made of elastic material and having a wiper strip head (20) and a wiper lip (26) which can be placed on a window (22) to be wiped, wherein the wiper lip (26) is designed as a wedge-shaped extension (24) of the wiper strip head (20) and has a point angle (42) of between 60 degrees and 150 degrees, said point angle leading into a contact surface (44) having a radius (46) of smaller than 100 micrometers, and also to a method for the production of said wiper blade.

18 Claims, 6 Drawing Sheets

WIPER BLADE

PRIOR ART

The invention is based on a wiper blade according to the generic type of the independent claims. DE 2336271 A1 has already disclosed a wiper blade with a wiper bracket which is composed of flexible plastic and is preshaped in a manner corresponding to the curvature of a windshield. The wiper blade is fastened in a groove of the wiper bracket or is produced integrally with the wiper bracket. The wiping quality of said wiper blade does not always meet expectations.

DISCLOSURE OF THE INVENTION

The wiper blade with the features of the main claim has the advantage of a defined geometry with which the wiper lip rests on the window during use. Said geometry which, in the case of wiper blades having a "tilting web", is achieved by tightening the flipped over wiper blade wedge, on the lower side of which the wiper lip is integrally formed, has proven important for a homogeneous wiping operation. In particular rattling and squeaking noises are avoided and a neat wiping pattern is achieved therewith. On the other hand, the construction of the tilting web has proven disadvantageous in the turning-over behavior in the reversal positions of the wiping movement. The laterally very stiff design of the spring rails of "joint-free" wiper blades causes the wiping wedge in the region of the tilting web to turn over very rapidly and, as a result, to produce an annoying flipping-over noise.

The tilting web can be dispensed with if the point angle of the wiper lip is between 60 degrees and 150 degrees and the contact surface has a radius of smaller than 100 micrometers. This ensures that the dragging position known from the wiper blade having a tilting web is simulated to a sufficiently good extent and, because of the small radius, the wiper lip does not break off contact with the window. At the contact surface, the force introduced via the wiper arm, the supporting element, the wiper strip and the wiper lip produces a pressure which ensures that the bond between the window and wiper blade is tight, and is therefore responsible for a streak-free wiping pattern. The conditions necessary for a neat wiping pattern are provided by the combination of limiting the radius in conjunction with the defined point angle.

The quality of the wiping pattern can be kept good even under extreme conditions if the point angle is between 75 degrees and 135 degrees because the dragging position is therefore conformed with even better. An optimum result is achieved with a point angle of 90° because then the average angle between the window surface and the side wall of the wiper lip corresponds to 45 degrees which has proven the best value in practice.

If the radius is kept smaller than 75 micrometers, the contact surface is reduced, as a result of which, at the same application of force via the wiper arm, the pressure between the contact surface and window surface and therefore the tightness are increased, which increases the quality of the wiping pattern. If the radius is selected to be smaller than 50 micrometers, the force applied by the wiper arm can be reduced and the entire system relieved of load.

In conventional wiper blade materials, the stated geometrical values result in an optimized wiping quality which can be further improved if the wiper strip material does not exceed a modulus of elasticity of 10 Newtons per square millimeter. As a result, the deformation of the contact surface is kept within justifiable limits. If the modulus of elasticity is managed to be kept smaller than or equal to 5 Newtons per square millimeter, then, in conjunction with the claimed geometrical values, the wiper lip point is deformed on the window in an optimum manner for the wiping operation and the tightness at the contact surface.

A considerably larger radius can be selected if at least the wiper lip is coated with a layer, the thickness of which does not exceed 100 micrometers. Radii of up to 10 millimeters are therefore possible. The latter can be produced in a particularly simple manner, for example by extrusion, and do not have to be cut.

A wiper blade according to the invention having a coated wiper lip, the layer thickness of which is not greater than 5 micrometers, can have a radius of 10 millimeters. In the case of a layer thickness of smaller than 25 micrometers, the radius can be 5 millimeters and, in the case of a layer thickness of not more than 75 micrometers, a radius of 1 millimeter is also possible. Within said limits, the wiping quality and the wiping operation have proven satisfactory in every situation.

By means of the special design of the wiper blade according to the invention without a tilting web and with a defined geometry, it is possible to produce the point angle by one of the two surfaces enclosing the point angle already being manufactured, for example by extrusion, injection molding or pressing. By contrast, the other surface is cut, and therefore a defined angle and a defined radius are produced.

DRAWINGS

Exemplary embodiments of the wiper blade according to the invention are illustrated in the drawings and explained in more detail in the description below.

DESCRIPTION

Figure 1:
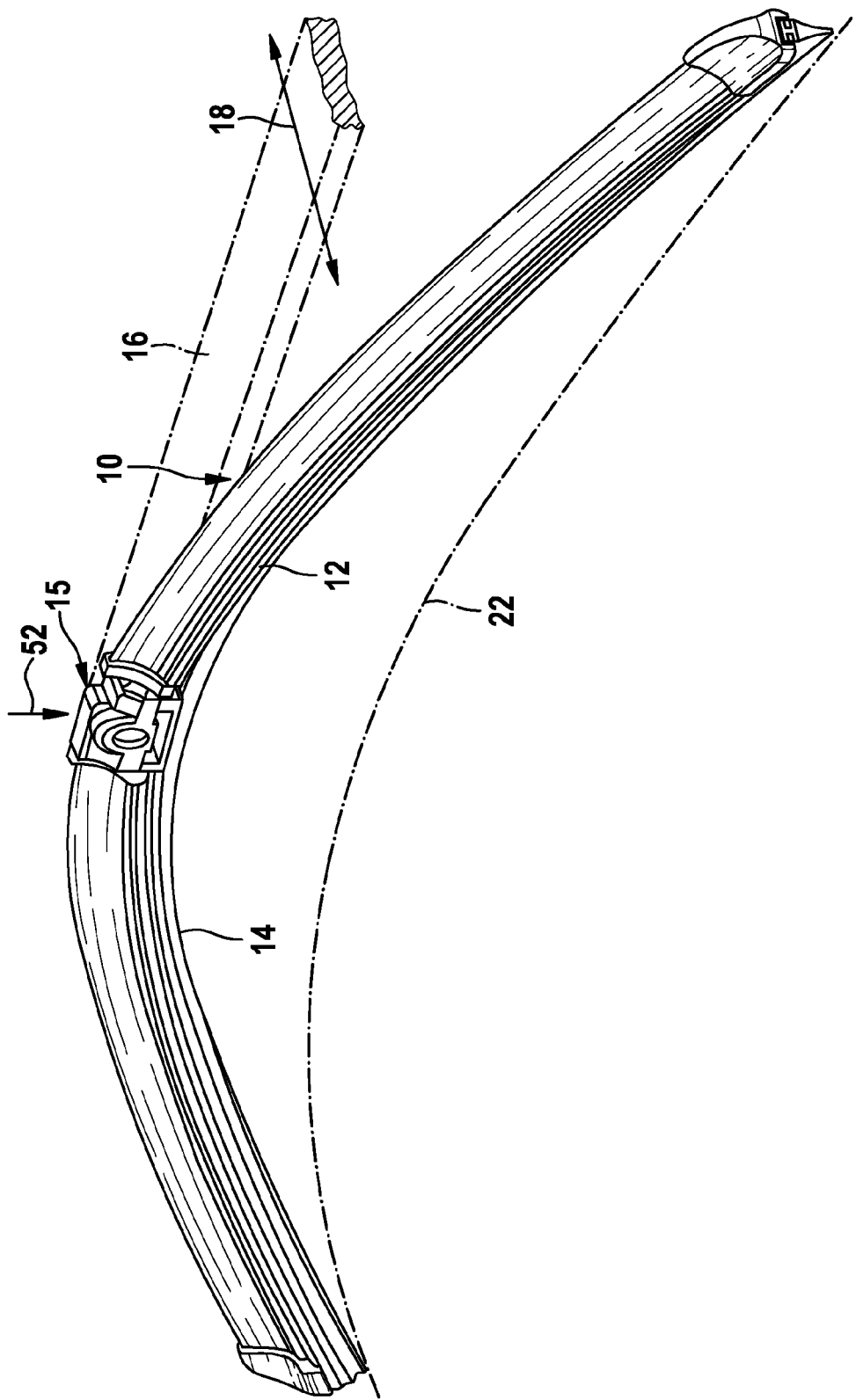
FIG. 1 shows an entire wiper blade in an oblique illustration.

A wiper blade 10 has a spring-elastic supporting element 12 which is elongated in the manner of a band and is in the form of two spring rails 30 running parallel at a distance from each other. Said spring rails are inserted by their mutually facing, inner edge strips 32 in longitudinal grooves 34 in a head strip 20 of a wiper strip 14 while their outer edge strips 36 protrude laterally for a distance out of the longitudinal grooves 34. Toward a vehicle window 22, a wiper strip head 20 is adjoined by a wiper lip 26 which slides over the vehicle window 22 in the direction of a double arrow 18 during a wiping movement. For this purpose, a wiper arm 16 drives the wiper blade 10 via a connection device, the wiper-blade-side part 15 of which can be connected to the wiper arm 16 in an articulated and releasable manner while said part sits fixedly in the central region of the wiper blade 10 on the supporting element 12 thereof. At the same time, the wiper arm 16 loads the wiper blade 10 in the direction of the vehicle window 22 with a contact pressure 24. The wiper arm 16 and the vehicle window 22 are indicated by chain-dotted lines.

The sharpest curvature of the vehicle window 22 is smaller than the curvature of the wiper blade 10 which bears at both of the ends thereof against the vehicle window 22 and is still unloaded. Under the contact pressure 24, the wiper blade 10 is placed with its wiper lip 26 over the entire extent thereof against the vehicle window 22. In the process, a tension is built up in the spring-elastic supporting element 12, which is manufactured from metal, said tension ensuring that the wiper strip 14 or the wiper lip 26 bears correctly over the entire length thereof against the vehicle window 22 and that the contact pressure 24 is uniformly distributed.

Figure 2:
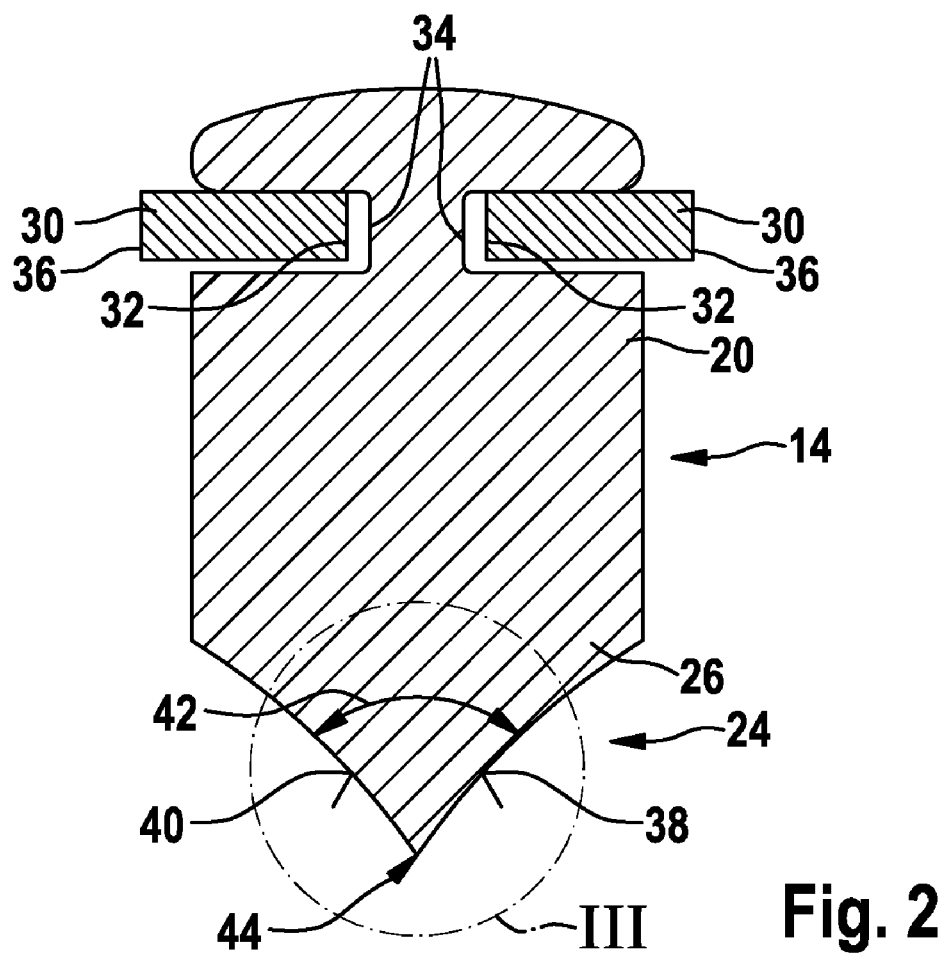
FIG. 2 shows a wiper strip in section.

FIG. 2 illustrates the wiper strip 14 in section. It can be seen that the wiper strip head 20 receives the spring rails 30 in longitudinal grooves 34 at its end which is illustrated at the top in FIG. 2 while it merges at its lower end into a wedge-shaped extension 24 which is then designed as the wiper lip 26. In this case, the wedge-shaped extension 24 is delimited by a first side wall 38 and a second side wall 40 which enclose a point angle 42 with each other. The side walls 38, 40 lead into a contact surface 44.

Figure 3:
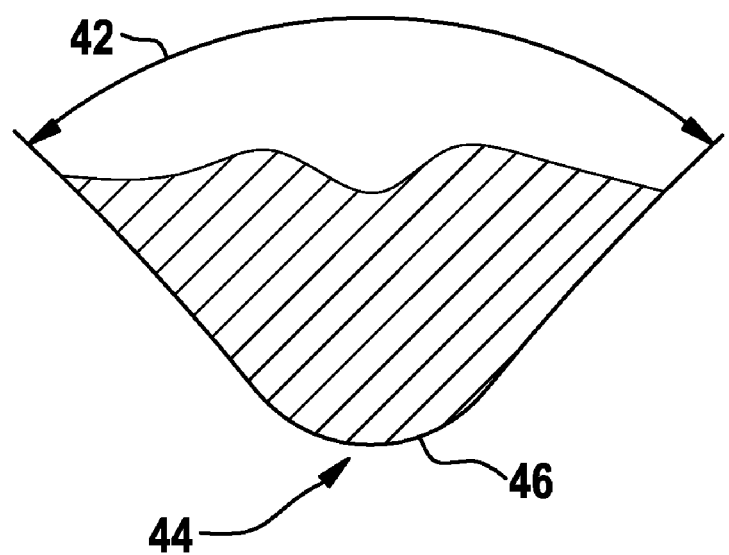
FIG. 3 shows a detail of the wiper lip point according to III in FIG. 2.
Figure 4:
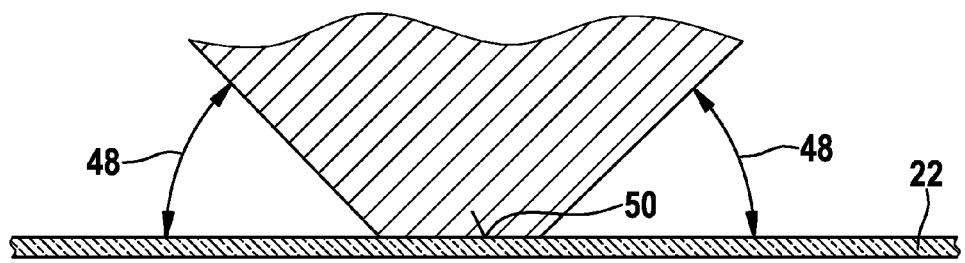
FIG. 4 shows the wiper lip point according to FIG. 3 in a working position.

FIG. 3 shows an enlarged illustration of the wiper lip point with its contact surface 44 which is delimited by a radius 46.

In the exemplary embodiment, the point angle 42 is selected to be 90 degrees and the contact surface 44 is selected to have a radius 46 of 50 micrometers. Said variables have proven optimum parameters because, inter alia, the wiping angle 48 between the vehicle window 22 and the respective side walls 38, 40 then assumes a size of 45 degrees and therefore the optimum value for the wiping operation.

However, it has also proven successful if the point angle 42 is between 75 degrees and 135 degrees, the choice of vehicle windows 22 for which the wiper blade 10 provided with said wiper strip 14 can be used then being smaller. The limits for a still tolerable wiping pattern lie within point angles of between 60 degrees and 150 degrees.

When the wiper blade is unloaded, i.e. when the wiper lip point does not rest on a vehicle window 23, the contact surface 44 is terminated by a radius 46, the optimum value of which is smaller than or equal to 50 micrometers. For the production of such a small radius 46, exact methods are necessary, and therefore, for less demanding conditions, for example vehicles having a lower final speed, an enlarged radius 46 not exceeding 75 micrometers can be selected. A radius of greater than 100 micrometers should be avoided because a larger effective contact surface 50 is also produced by said larger radius. It has been demonstrated that, under said conditions, the surface pressure which is responsible for the tightness between the wiper rubber and window becomes smaller and the transition from the effective contact surface 50 to the side walls 38, 40 rises in a shallower manner, which promotes floating on the surface or aquaplaning.

For said geometrical ratios, it is therefore necessary to increase the force 52 with which the wiper arm 16 presses the wiper blade 10 onto the vehicle window 22. The surface pressure at the effective contact surface 50 should be greater than 1 MPa, and preferably greater than 1.2 MPa.

Figure 5:
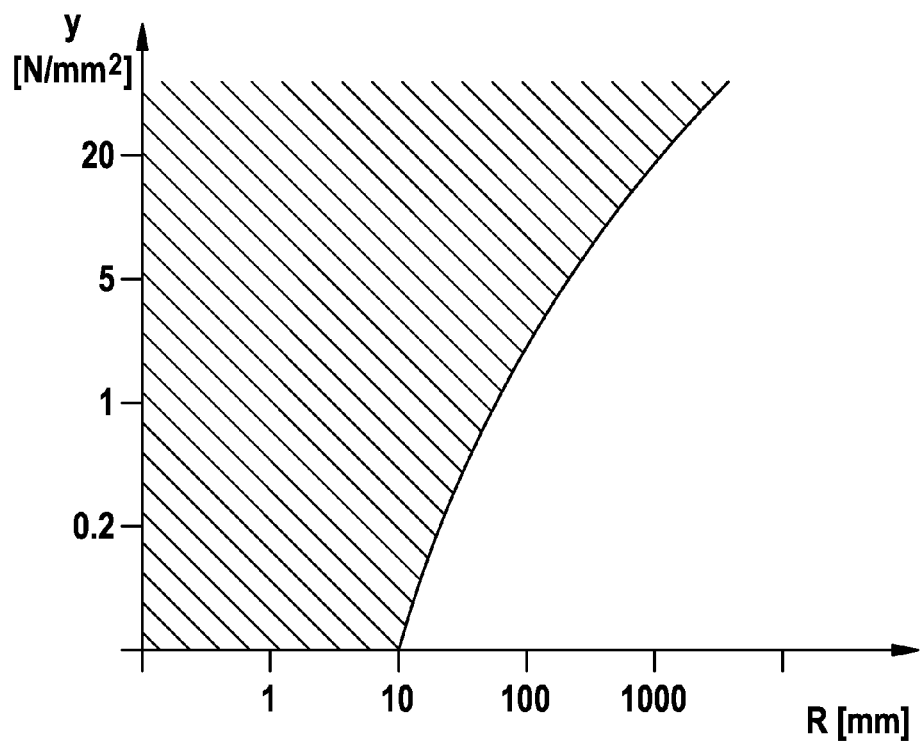
FIG. 5 shows a diagram illustrating the relationship between the radius of the contact surface and the modulus of elasticity of the wiper lip point.
Figure 6:
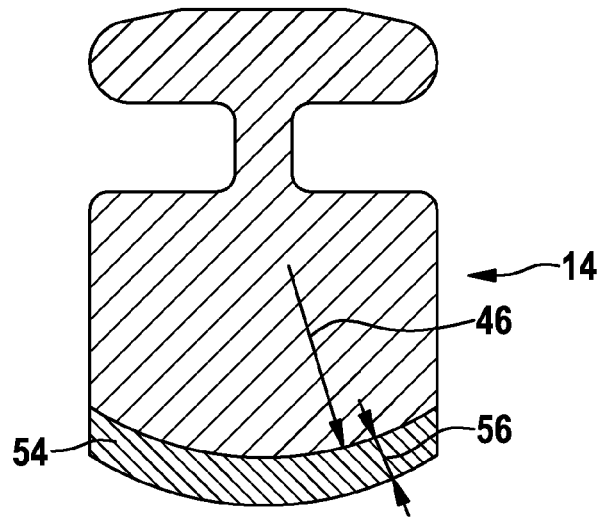
FIGS. 6 to 11 show further exemplary embodiments of the wiper strip in section.
Figure 7:
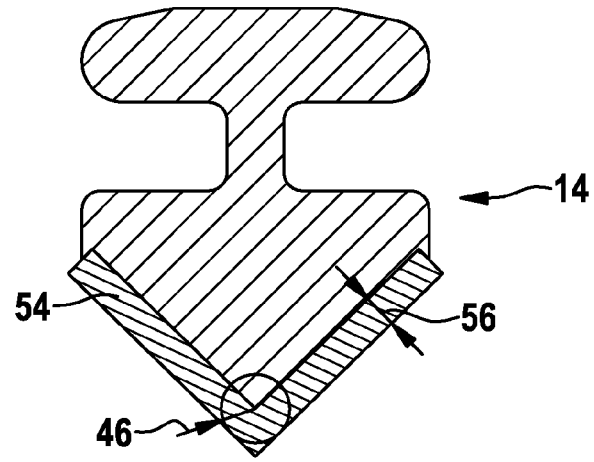
Figure 8:
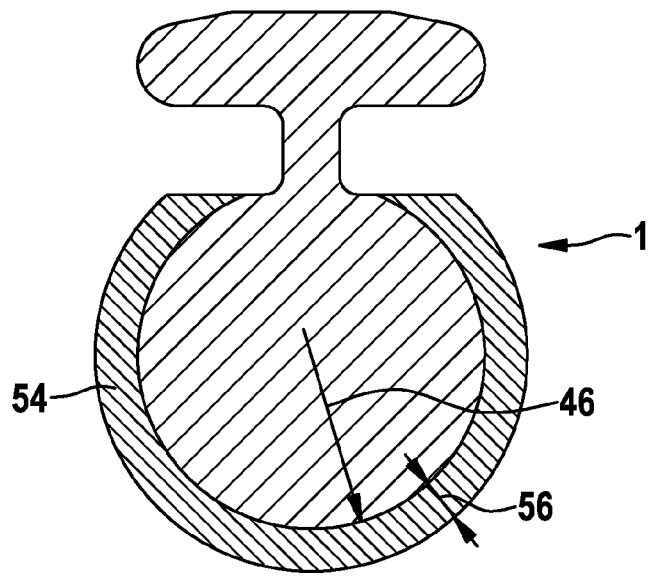

It has furthermore been demonstrated that the wiping quality depends on the modulus of elasticity Y of the wiper rubber material and should at least be smaller than 10 Newtons per square millimeter, and preferably smaller than or equal to 5 Newtons per square millimeter. In this case, the magnitude of the modulus of elasticity is not necessarily independent of the radius. For an optimum wiping result, the modulus of elasticity and the radius should lie within the hatched quadrant of the diagram illustrated in FIG. 5.

The ratios turn out to be different if the wiper strip 14 is coated with a layer 54 at least in the region of the extension 24 or of the contact surface 44. The radius 46 can then assume extreme values of up to 10 millimeters. Preferred wiper strip shapes are illustrated in FIGS. 6 to 11. The layer thickness 56 can assume different values depending on the radius 54. It has turned out by means of extensive investigations that at a radius 46 of 10 mm the layer thickness 56 should not be greater than 5 micrometers, at a radius 46 of 5 millimeters the layer thickness 56 should not be greater than 25 micrometers and at a radius 46 of 1 millimeter the layer thickness 56 should not be greater than 75 micrometers.

Figure 9:
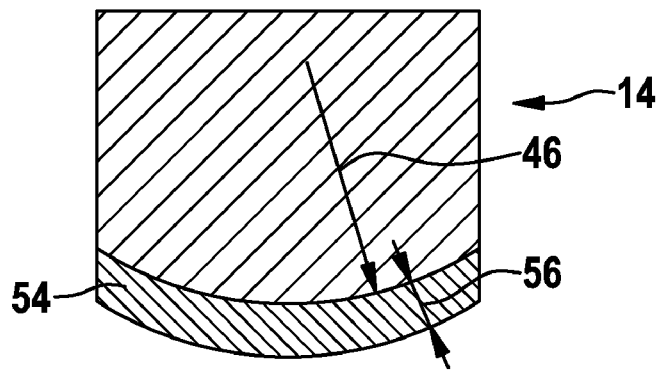
Figure 10:
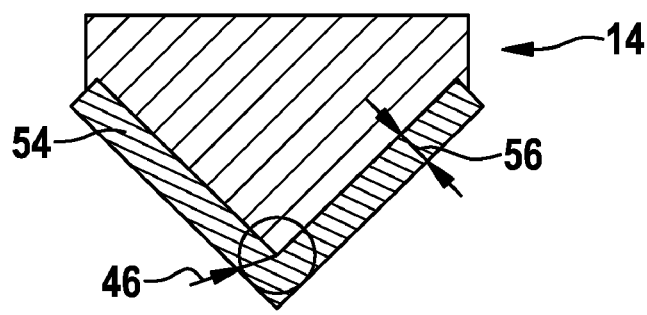
Figure 11:
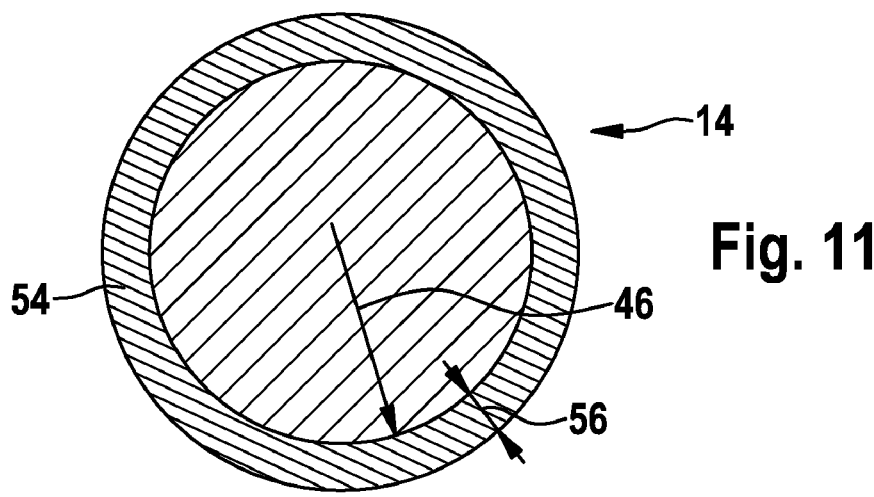

FIGS. 9 to 11 illustrate wiper strips which do not have any longitudinal grooves 34 for spring rails 30. In the case of said wiper strips 14, the spring rails are replaced by a region having a higher modulus of elasticity Y. Said region can be extruded on or can be produced by a gradual transition from a small modulus of elasticity in the region of the wiper lip to a high modulus of elasticity in the region of the wiper strip head.

In a method according to the invention for production into a wiper blade according to the invention, the wiper strip 14 is extruded, injection molded or pressed in a first step in which the first side wall 38 is manufactured during the extruding operation, the injection molding or the pressing, while the second side wall 40 provided, at least in the region adjacent to the contact surface 44, with a volumetric body 58 (FIG. 12) which is then cut to size. Cutting takes place in the direction of the arrow 60. For this purpose, the wiper strip 14 is either drawn past a stationary or rolling blade or past a laser beam or water jet. A water jet would be used in the direction 60 and a laser beam counter to the direction 60.

Figure 12:
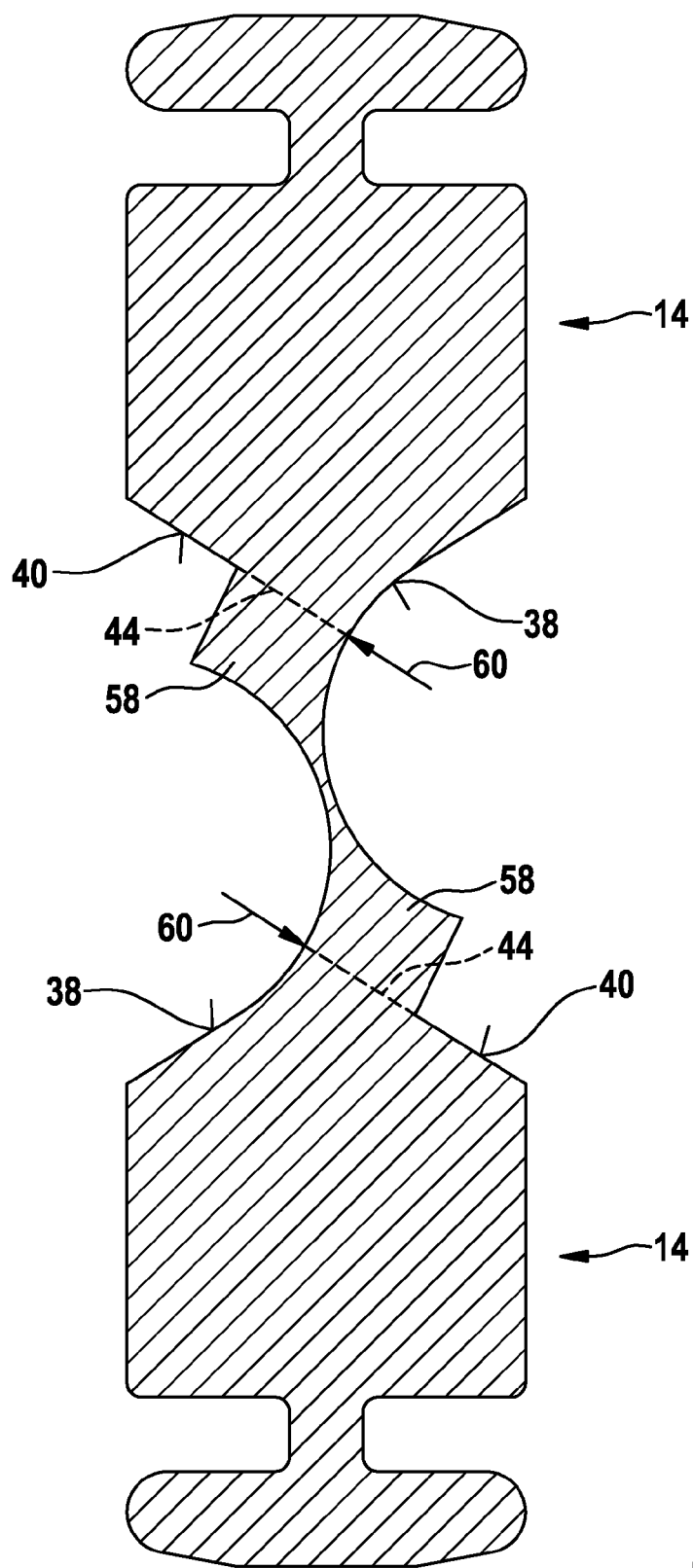
FIG. 12 shows an example of a wiper strip which has not yet been cut.

As can be seen in FIG. 12, two wiper strips 14 are jointly produced and are connected to each other via the volumetric body 58.

The invention claimed is:

1. A wiper blade (10) with a wiper strip (14) made of elastic material and having a wiper strip head (20) and a wiper lip (26) which can be placed on a window (22) to be wiped, wherein the wiper lip (26) is designed as a wedged-shaped extension (24) of the wiper strip head (20) and has a point angle (42) of between 60 degrees and 150 degrees, said point angle leading into a contact surface (44) having a radius (46) of smaller than 100 micrometers.

2. The wiper blade (10) as claimed in claim 1, characterized in that the point angle (42) is between 75 degrees and 135 degrees.

3. The wiper blade (10) as claimed in claim 2, characterized in that the radius (46) is smaller than 75 micrometers.

4. The wiper blade (10) as claimed in claim 3, characterized in that the wiper strip material has a modulus of elasticity (Y) of smaller than 10 Newtons per square millimeter.

5. The wiper blade (10) as claimed in claim 1, characterized in that the radius (46) is smaller than 75 micrometers.

6. The wiper blade (10) as claimed in claim 1, characterized in that the wiper strip material has a modulus of elasticity (Y) of smaller than 10 Newtons per square millimeter.

7. The wiper blade (10) as claimed in claim 1, characterized in that the wiper lip (26) has first and second surfaces (38, 40) enclosing the point angle (42) between them, the one, first surface (38) being produced by extrusion, injection molding or pressing and the second surface (40) being cut.

8. The wiper blade (10) as claimed in claim 1, characterized in that the point angle (42) is 90 degrees.

9. The wiper blade (10) as claimed in claim 1, characterized in that the radius (46) is smaller than or equal to 50 micrometers.

10. The wiper blade (10) as claimed in claim 1, characterized in that the wiper strip material has a modulus of elasticity (Y) of smaller than or equal to 5 Newtons per square millimeter.

11. A method for the production of a wiper blade (10) as claimed in claim 1, characterized in that the wiper strip (14) is extruded, injection molded or pressed in a first step in which one side (38) of the point angle (42) is manufactured and, in a second step, an additional volume (58) is cut off in order to produce the second side (40) of the point angle (42).

12. A wiper blade (10) with a wiper strip (14) made of elastic material and having a wiper strip head (20) and a wiper lip (26) which can be placed on a window (22) to be wiped, characterized in that the wiper lip (26) is designed as a wedge-shaped extension (24) of the wiper strip head (20) and has a point angle (42) of between 60 degrees and 150 degrees, said point angle leading into a contact surface (44) having a radius (46) of smaller than 10 millimeters, and at least the wiper lip is coated with a layer (54), the thickness of which does not exceed 100 micrometers.

13. The wiper blade (10) as claimed in claim 12, characterized in that the radius (46) does not exceed 10 millimeters and the thickness of the layer (54) does not exceed 5 micrometers.

14. The wiper blade (10) as claimed in claim 13, characterized in that the wiper lip (26) has first and second surfaces (38, 40) enclosing the point angle (42) between them, the one, first surface (38) being produced by extrusion, injection molding or pressing and the second surface (40) being cut.

15. The wiper blade (10) as claimed in claim 12, characterized in that the wiper lip (26) has first and second surfaces (38, 40) enclosing the point angle (42) between them, the one, first surface (38) being produced by extrusion, injection molding or pressing and the second surface (40) being cut.

16. The wiper blade (10) as claimed in claim 12, characterized in that the radius (46) does not exceed 5 millimeters and the thickness of the layer (54) does not exceed 25 micrometers.

17. The wiper blade (10) as claimed in claim 12, characterized in that the radius (46) does not exceed 1 millimeter and the thickness of the layer (54) does not exceed 75 micrometers.

18. A method for the production of a wiper blade (10) as claimed in claim 12, characterized in that the wiper strip (14) is extruded, injection molded or pressed in a first step in which one side (38) of the point angle (42) is manufactured and, in a second step, an additional volume (58) is cut off in order to produce the second side (40) of the point angle (42).

* * * * *